Jan. 9, 1934.  J. V. L. HOGAN ET AL  1,943,238
TELEVISION METHOD AND APPARATUS
Filed Sept. 5, 1931  2 Sheets-Sheet 2
Fig. 2.
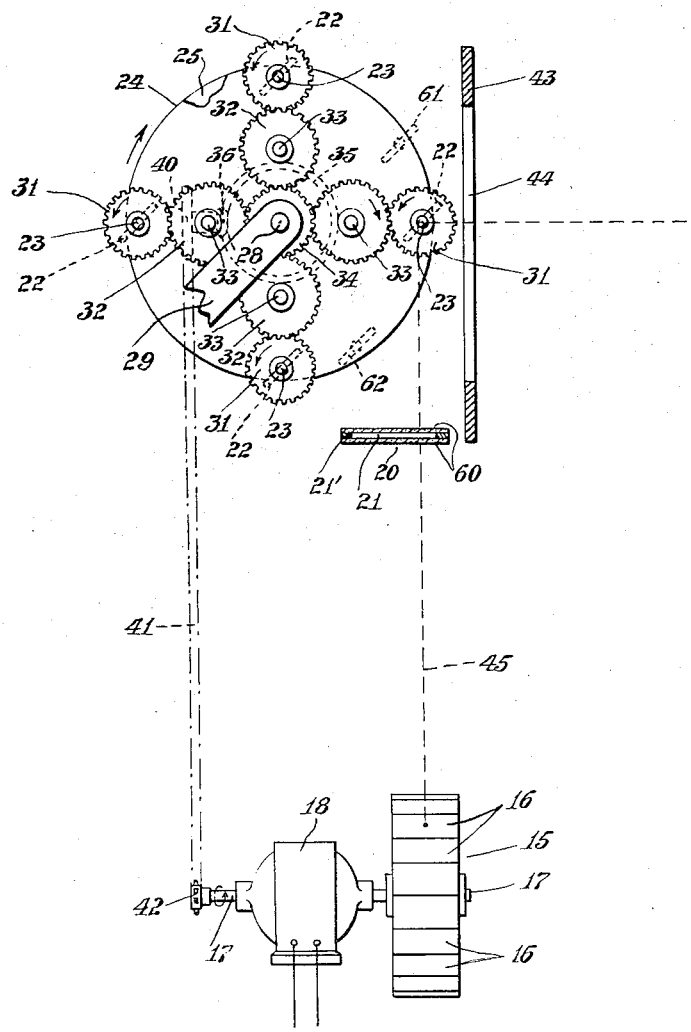
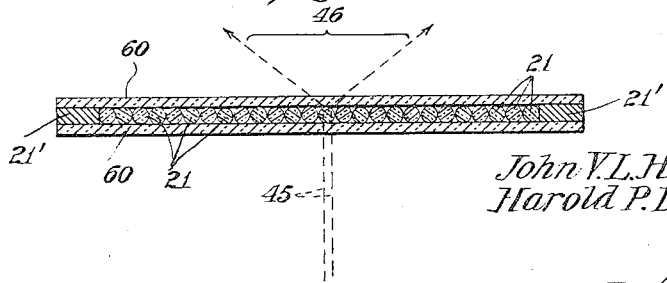
Fig. 3.
John V. L. Hogan
Harold P. Donle
INVENTORS
BY
ATTORNEY Patented Jan. 9, 1934

1,943,238

UNITED STATES PATENT OFFICE 1,943,238

TELEVISION METHOD AND APPARATUS

John V. L. Hogan, Forest Hills, N. Y., and Harold P. Donle, Meriden, Conn., assignors to Radio Inventions, Inc., New York, N. Y., a corporation of New York Application September 5, 1931. Serial No. 561,380

9 Claims. (Cl. 178—6)

The present invention is an improved method and means for scanning an optical image, as in television reception or the like.

One object of our invention is to provide a scanned image of high brilliance.

Another object of our invention is to provide an image which may be viewed well by observers stationed over adequately wide vertical and horizontal angles and at various distances from the scanning mechanism.

A further object of our invention is to provide a relatively large image substantially free from the distortion which occurs with many scanning methods, especially where enlarging lenses are employed.

Another object of our invention is to provide an apparatus which accomplishes smooth and accurate scanning, and yet requires operations of a relatively low degree of precision for its manufacture, so that it consequently will be relatively inexpensive to manufacture.

A still further object of our invention is to provide an apparatus of small size relative to the apparent size of image produced.

More particularly this invention comprises apparatus for scanning optical images in at least one dimension by means of moving light deflecting or reflecting surfaces, which may be substantially plane in a direction perpendicular to the direction of scanning and which move as a whole in the scanning direction. These optically active surfaces are given a planetary motion, i. e., each surface moves about its individual axis according to a law fixed by the design of the apparatus, and in turn these individual axes are subject to a substantially uniform motion about an external common axis.

This invention includes certain features already disclosed in the co-pending application of John V. L. Hogan, entitled Television scanning system, Serial No. 557,006, filed August 14, 1931.

One form of our invention is shown in the accompanying figures.

Fig. 2 shows, partly in section, a side elevation of the apparatus of Fig. 1.

Fig. 3 depicts one form of light diffusing screen or grating, suitable for use with this invention.

Figure 1:
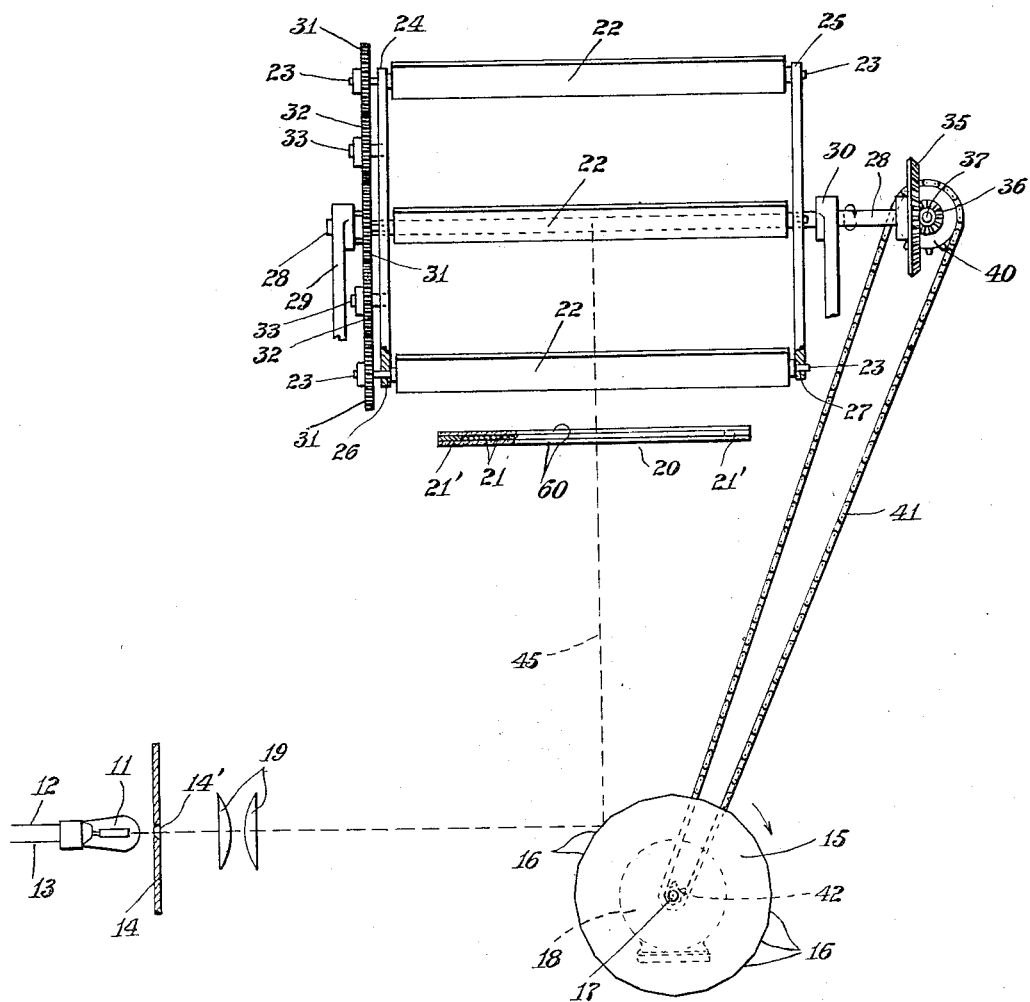
Fig. 1 shows a front elevation of apparatus comprising the preferred form of our invention.

Referring to Figs. 1 and 2, a light source 11 is shown as a neon lamp with a small luminous area and supplied with image-modulated current through leads 12 and 13. 15 is a scanning drum provided with a plurality of plane mirrors 16 near its periphery and mounted upon shaft 17 of motor 18, the latter preferably of a type operated at a speed synchronous with or proportional to the scanning speed at the transmitter.

A plurality of substantially rectangular mirrors 22 are mounted on axes 23 supported between end plates 24 and 25 by means of bearings 26 and 27. The end plates are secured to shaft 28 supported in bearings 29 and 30. Each axis 23 carries on one extremity a spur gear 31, engaging with another spur gear 32 rotatably mounted upon an axis 33 fixed to end plate 24. A stationary spur gear 34 similar to gear 31 is mounted concentric with shaft 28 and engages gear 32. This gear 34 is fixed to bearing 29 or to any other suitable stationary support. Thus the structure incorporates a planetary gear system, and when shaft 28 is rotated the mirrors 22 remain in an angular position substantially fixed with respect to the frame of the apparatus and are optically active when between the two positions indicated by dotted lines at 61 and 62.

Shaft 28 is preferably rotated in synchrony with drum 15 as by means of motor 18, through a suitable drive means such as the bevel gear 35 fixed on the end of shaft 28 and engaging the bevel gear 36 on counter shaft 37, which latter in turn is rotated through the intermediary of sprocket 40, chain 41, and sprocket 42, this last being affixed to shaft 17 of motor 18.

A stop 14, with preferably rectangular aperture 14' may be placed between light source 11 and drum 15. This stop serves to define the light spot projected via 16 upon the screen 20 and to confine the light to the useful path of projection, but may be omitted when other means are employed to limit the light, for example, if the spot light source itself gives a sufficiently narrow beam. Condensing lens system 19 comprising one or more lenses, which may be cylindrical, also concentrates and allows adjustment of the dimensions of the spot of light falling upon drum 15.

A light diffusing grating 20 is disposed between drum 15 and mirrors 22 and serves to diffuse light from source 11 substantially wholly in a direction parallel to the length of mirrors 22. Opaque stops 21' at the ends thereof may be used to delimit the horizontal dimension of the visible image.

A stop 43 with a vertically defined viewing aperture 44 may be placed between mirrors 22 and the observer, to limit the vertical dimensions of the visible image to that of one complete picture.

Fig. 3 shows a detail of the cross section of one form of diffusing grating 20. A plurality of small rods 21 of glass, quartz, or other suitable transparent refracting substance are laid closely together and bound in a spacing frame 21' for instance by means of a suitable cement, by a clamp, or by any other appropriate means. Transparent plates of glass or the like, indicated at 60 may advantageously be used to retain the rods in the frame, which latter may be opaque and serve to delimit the useful optical area of the grating as a whole. The diameter of any individual rod should preferably be substantially less than the horizontal dimension of the effective elemental scanning spot, although shown larger than this in the drawings for purpose of clear illustration.

The action of the grating is illustrated by the path of the light ray 45 in the middle of the incident beam which, on passage through the grating, is diffused through a wide angle 46 in a plane perpendicular to the rods. The ray suffers no substantial refraction in a plane or planes parallel to the axes of the unitary rods and perpendicular to the grating as a whole. This grating may be constructed in other forms such as a transparent plate having semi-cylindrical parallel ridges raised or indented upon one or both of its surfaces, as by molding, grinding, scratching or other suitable processes. These forms of diffusing screens are disclosed in the copending application of Harold P. Donle, No. 558,486, filed August 21, 1931.

Referring again to Fig. 1 and Fig. 2, a light beam 45 is shown projected from source 11, passing through limiting aperture 14' and reflected from scanning mirror 16 to grating 20, which diffuses it along moving mirror 22. Thence it is reflected to the eye of an observer through framing aperture 44 in section 43. A real secondary image of the received picture is thus formed upon grating 20, being scanned, however, in only one direction. Scanning in the other direction is accomplished by the movement of mirrors 22.

Grating 20 is positioned with the length of rods 21 therein substantially parallel to the length of mirrors 16 on drum 15. The active dimension of grating 20 in the direction of its rods should be at least three times the vertical scanning dimension, or scanning line width.

The dimension of the grating in a direction perpendicular to its component rods is substantially equal to the width of the reproduced picture as viewed in mirrors 22, although we do not confine our invention to such sizes as above indicated.

Still referring to the figures and assuming that the mirror drum is rotating in a direction indicated by the arrows, it is to be noted that the effective distances from what may be termed the solar center of the system, assumed by successively higher portions of the individual mirrors utilized by any given ray of light-beam 45, progressively increases as the mirrors move downward relative to this beam.

This increasing radial distance of such portion of the mirrors causes the ray of light striking thereupon to reach the eye of the observer at such an angle that it will appear to him as coming from points successively displaced downwards, as the drum rotates, so combining with the downward motion of the mirrors as to cause a vertical downward scanning of the field.

Further to clarify this action, consider only the ray at the extreme left of beam 45 depicted in Fig. 2 which ray will strike the lower edge of the mirror just entering the field of optical action as indicated by the position 61. As such mirror progresses downwardly, the point of incidence and reflection of such beam will suffer two displacements, the one in a downward direction, and the other in a lateral direction away from the solar center of rotation. These displacements may be considered as due to the complex planetary motion of the individual mirror, i. e., its rotation about its own axis and the rotation of its axis about a common solar rotational center.

Since the angle of reflection of the incident beam is a function of these variables, it is manifest that by properly choosing the latter, the resultant function can be made to have a value which will accord with the foregoing description of progressive and substantially uniform vertical displacement of the reflected beam to produce field scanning.

The apparent vertical dimension of the elemental light spot visible to the observer varies in accordance with several factors among which are included the width of slot 14' in stop 14, the total distance from stop 14 to grating 20 and the nature and adjustment of condensing system 19.

The apparent width of the elemental light spot varies, inter alia, with the height of slit 14' in stop 14, the properties of condensing system 19 and with the distances between drum 15, grating 20 and light source 11, respectively. The apparent size of said elemental spot may be made as nearly constant as desired over all points of the area of the image by increasing the distances from stop 14 to mirror 23 and/or from drum 15 to grating 20, although a slight variation at different portions of the picture, in the size of said spot is not, in practice, a noticeable detriment to the picture quality.

The width of mirrors 22 along their short dimensions should not be too great, so as to avoid optical interference between successive mirrors, while still preserving the vertical visual angle.

It is evident from Fig. 1 and Fig. 2 that the observer may satisfactorily view the image from any point over a wide horizontal visual angle because of the diffusing effect of grating 20 and the length of mirrors 22. Likewise the observer may view the image substantially equally well over a wide range of distances from this scanning device.

While not confining our invention to any particular scanning speed or number of scanning elements the following example serves to illustrate one possible relation between these components.

The product of the number of mirrors 22, times the speed of shaft 28 in R. P. S. may be equal to the number of pictures per second. Similarly the product of the number of mirrors 16 times the speed of drum 15 in R. P. S. may be equal to the product of the number of pictures per second times the number of lines per picture.

A suitable construction for the direct production of a picture approximately 3" x 4" in size uses 4 planetary mirrors each 6" x ¾". The fixed centre gear and each planetary gear is about 1" in diameter, while the 4 intermediate idler gears are 1¼" in diameter.

The grating 20 is 1" in width, 4" in active length and composed of approximately 150 rods.

The fast drum is 3" in diameter and carries 20 mirrors each approximately 1" long and ½" wide. This drum rotates at 3600 R. P. M. while the slow drum is about 4¼" in diameter and rotates at 300 R. P. M., for scanning 60 lines per frame and 20 frames per second.

Vertical framing of the image may be accomplished by any of several means such as the insertion of a friction clutch in counter-shaft 37. Horizontal framing may be had by provision of a rotatable field frame on motor 18, or other suitable means.

One modification of our invention allows a wider angle of vision in a vertical direction. This comprises the use of very slightly convex mirrors, instead of plane mirrors upon the planetary scanning drum to increase the extent of the vertical field of view.

In the case of the modification just described the vertical path of the scanning beams will be substantially parallel to each individual observer, since he is using at any one instant, beams reflected from only an elemental width of the mirror, which approaches a plane surface in effect.

The form of our invention described above may be modified by substitutions, additions, or other changes apparent to one skilled in television or related arts, without affecting the principles of our invention as hereinafter claimed. For example, the scanning drum shown in Fig. 1 and Fig. 2 may be replaced by a revolving disc having radial slits or lenses arranged to accomplish substantially the same result of rapid scanning in one dimension. When a scanning disc replaces drum 15, it may be advantageous to keep the diameter of the disc small by employing a concave lens situate between it and the planetary drum.

In addition stationary or moving lens systems may be added for the purpose of concentrating the path of light or reducing the size of said disc, drum or drums as required, the optical order of the various elements may be varied or reversed, with appropriate modification of their design, other methods of producing motion than those herein set forth may be adopted, and/or another light source than a small-area neon lamp may be used, without affecting the scope of our invention as defined by the hereunto appended claims.

We claim:

1. Television apparatus comprising a light source, line scanning means operating in conjunction therewith, selective uni-directional diffusing means receiving the line-scanned light, a system of mirrors receiving light from said diffusing means, and planetary gear means for moving each of said mirrors successively across the field of view and maintaining them substantially mutually parallel so as to cause the rays reflected from said mirrors to any point of image viewing to appear emergent from successive portions of said mirrors.

2. A system of television scanning including means for optically displacing a luminous line for viewing by an observer, said means comprising a plurality of mirrors, means for rotating them as a whole about a common axis and means for simultaneously rotating each mirror about its individual axis so as to remain substantially parallel to all other said mirrors.

3. Television apparatus including a light source modulated by television signals, a light collecting optical system, a drum carrying a plurality of substantially plane mirrors upon its circumference, means for rotating said drum so as to scan in one dimension, light diffusing means, uni-dimensional scanning means including a series of substantially plane mirrors, means for maintaining said mirrors substantially parallel to one another and in substantially continuous planetary rotation so as to scan in the other dimension, and means for viewing the completely scanned image reflected from said last mentioned mirrors.

4. In television scanners employing mirrors with complex rotary motions, the method of maintaining a constant angular relationship between the mirrors and the scanning field which includes continuously imparting to the mirrors a rotation about individual axes and isochronously rotating said axes about a common central axis.

5. In television scanners moving a plurality of mirrors across a field of view, means for always maintaining a constant angular relationship between said mirrors and said field including means for rotating each mirror about its own axis and means for moving said individual axes about a common solar axis with substantially isochronous planetary motions.

6. Television scanning apparatus including a plurality of mirrors mounted to rotate by means of planetary gears, idler gears meshing with said planetary gears, and a rotating structure carrying the axes of rotation of both said sets of gears and in rotation about a central fixed gear meshing with said idler gears.

7. Television scanning mechanism including a plurality of curved mirrors rotated by planetary gears affixed thereto, idler gears meshed with said planetary gears, a fixed gear at the centre of the planetary system, and a rotating structure carrying the axes of rotation of both said sets of planetary and said idler gears and rotating about said fixed gear.

8. Television apparatus for scanning in one dimension comprising rotary driving means, a rotating structure driven by said means and bearing in substantially cylindrical array a plurality of curved mirrors, rotatably mounted in said structure and means for driving said mirrors so that each rotates about its own axis isochronously with the rotation of the entire structure about the axis of the latter.

9. The method of television reception which includes scanning a light source in at least one dimension by moving curved mirrors successively across the output of said light source, and simultaneously continuously rotating said mirrors about their own axes so that they bear a substantially constant angular relationship to the output of said light source.

JOHN V. L. HOGAN.
HAROLD P. DONLE.